J. DANBY,

Assignor to J. S. McDANIEL.

PRESSURE REGULATOR VALVE.

No. 9,835. Reissued Aug. 9, 1881.

Witnesses:

W. F. Kircher

L. Douville

Inventor:

James Danby, by John A. Wiedersheim

ATTORNEY.

N. PETERS, Photo-Lithographer, Washington, D. C.

UNITED STATES PATENT OFFICE.

JAMES DANBY, OF WILMINGTON, DELAWARE, ASSIGNOR TO JOHN S. McDANIEL, OF SAME PLACE.

PRESSURE-REGULATOR VALVE.

SPECIFICATION forming part of Reissued Letters Patent No. 9,835, dated August 9, 1881.

Original No. 223,891, dated January 27, 1880. Application for reissue filed April 18, 1881.

*To all whom it may concern:*

Be it known that I, JAMES DANBY, a citizen of the United States, residing at Wilmington, in the county of New Castle, State of Delaware, have invented a new and useful Improvement in Pressure-Regulator Valves for Steam and Fluids, which improvement is fully set forth in the following specification and accompanying drawings, in which—

Figure 1:
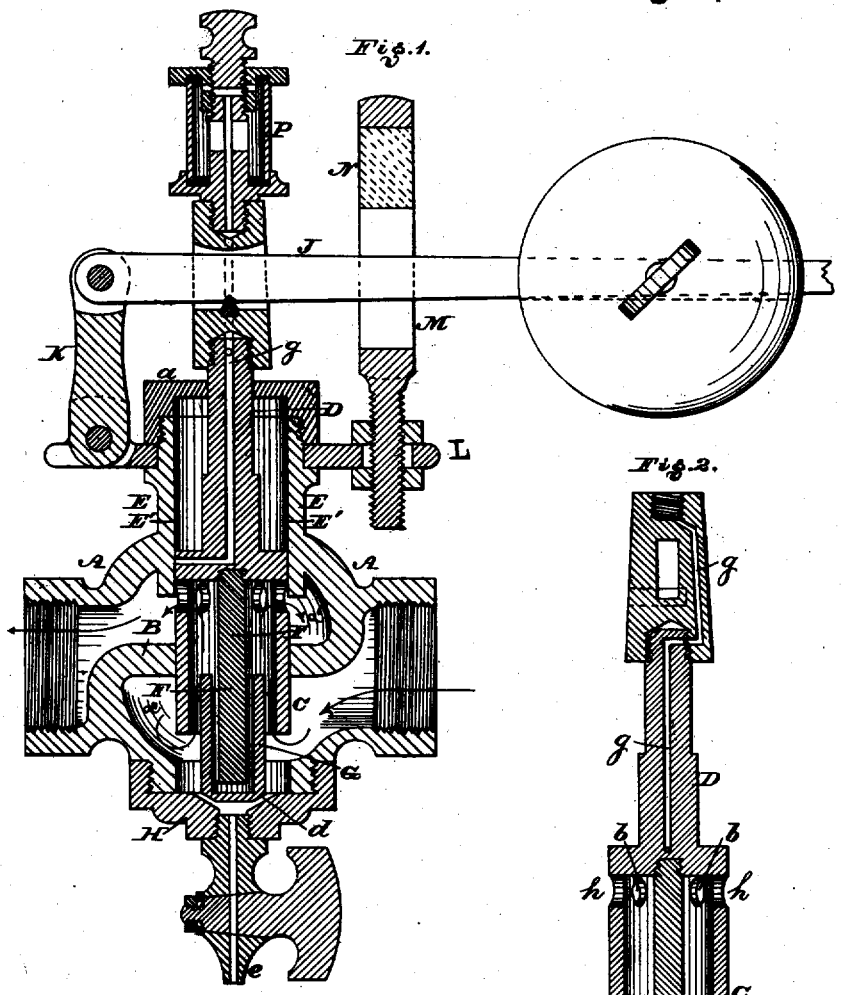
Figure 2:
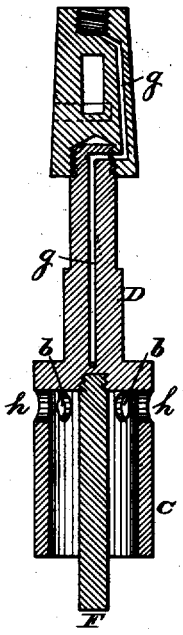

Figure 1 is a vertical section of the valve embodying my invention. Fig. 2 is a vertical section of a detached portion at a right angle to that shown in Fig. 1.

Similar letters of reference indicate corresponding parts in the two figures.

My invention relates to improvements in pressure-regulator valves for steam and other fluids; and it consists in the construction and combination of parts as will be hereinafter fully set forth and definitely claimed.

Referring to the drawings, A represents the shell of the valve, and B the wall or diaphragm between the inlet and outlet branches thereof. C represents a hollow valve, which is closed at the top and open at the bottom, fitted in the opening in the wall B, and suspended from a stem, D, which passes through the top cap, *a*, of the shell, said valve having its lower open end extend below the diaphragm B.

In the upper part of the valve C are openings *b*, which communicate with the interior of the same and with the exit branch of the valve, and the upper portion of the shell provides a chamber, E, for the play of the valve C, its inner wall constituting the seat of said valve, as at E′.

Depending from the top plate of the valve C is a stem, F, which enters a tubular guide, G, rising from the bottom of the shell, and plays therein telescopically, whereby the valve C is guided and caused to work true, and the bottom of the shell is in the form of a cup, H, which receives the condensed steam, and is formed with passages *d* for causing the escape of the same and preventing freezing of the valve, a suitable cock, *e*, being provided for opening and closing the passages, the stem, tubular guide, and cap being, however, nonessential parts of the invention.

J represents a weighted lever, which is passed freely through a vertical slot in the upper part of the stem D, and has its bearing on said stem, for which purpose the bottom wall of the slot has a knife-edge, *f*, which enters a notch on the lever. The axis of the lever is on a link-fulcrum, K, which is pivoted to a yoke, L, encircling the upper part of the shell, and from said yoke rises a slotted guide, M, through which the lever is passed, the upper part of the guide being occupied by, or provided with, a piece, N, of rubber or other elastic material, forming a stop against which the lever may strike and be cushioned when a sudden or extraordinary high pressure of steam is exerted on the valve C.

Surmounting the stem D of the valve is a lubricator, P, and in said stem is a duct, *g*, which communicates with the lubricator and directs the lubricant therefrom to the seat E′ of the valve C, whereby provision is made for lubricating the valve and causing it to move with ease and smoothness, this feature of lubricating the valve not being the subject-matter of the present invention.

Circumscribing the exterior of the openings *b* at the top of the valve C is a groove, *h*, which, when the steam escapes through said openings when uncovered, permits the steam to pass from one opening to the other, and thus provides an extra way or channel for the steam, whereby the sensitiveness of the valve is increased.

The weight or load of the lever is adjusted relatively to the required pressure of the steam to be maintained. The steam enters the shell and fills the chamber *a″* below the diaphragm B and enters the hollow valve C from below, so that the valve is subjected to the steam-pressure within and without. The steam escapes through the openings *b* into the chamber *a″* above the diaphragm B, and, passing around the exterior of the top of the valve, leaves the shell through the exit branch, it being seen that the steam presses almost equally on the inner and outer surfaces of the valve C. When the pressure increases the valve rises and the openings are covered by the seat E′, the effect whereof is to reduce the volume of steam passed off, and when the pressure decreases the valve falls and uncovers the openings to a greater extent, thus allowing the escape of a greater volume of steam, the reduction or increase in the volume of steam directed from the valve continuing until the proper pressure is restored, and thus an equable pressure is maintained. As the lever rests on the knife-edge *f* and is pivoted to the link-fulcrum K, and the latter is pivoted to the yoke L, the lever is raised and lowered with the utmost freedom, and thereby assists in increasing the sensitiveness of the valve.

If desired, the stem F may be tubular and receive the guide G without affecting the operation of these parts.

The cylinder or chamber E is formed with an annular exterior flange around its upper portion and screw-threaded above said flange. The upper end of said cylinder is closed by the cap *a*, which consists of a circular head and an annular internally-screw-threaded flange, whereby said cap screws upon the threaded upper end of said cylinder. A yoke, L, occupies the space between said cap and the flange on said cylinder, and may be rotated in order to adapt it to different positions. When said cap is screwed home it serves the double purpose of closing the upper end of the cylinder and clamping the yoke tightly in position. By unscrewing the cap the yoke and attached parts are disengaged from the cylinder. The same movement serves to open the cylinder itself. This yoke serves as a base for the fulcrum-link K, which is pivoted thereto, and also for the guide M, which is arranged to be adjustable up and down through an aperture in said yoke on the side opposite to said fulcrum-link. The lower end of this guide is screw-threaded, and provided with two nuts, one of which is above the yoke and one below it. By means of these nuts and this screw-threaded end the said yoke may be adjusted up or down, so as to limit the throw of the lever J, as desired.

Having thus described my invention, what I claim as new, and desire to secure by Letters Patent, is—

1. The cylinder E and yoke L, secured thereon, in combination with the guide M, having an elastic stop, N, and a screw-threaded shank, which is vertically adjustable through said yoke by means of nuts, substantially as set forth.

2. The shell A, with diaphragm B in its body, and valve-seat E′ in the top chamber, E, the hollow valve C, closed at top and open at bottom and perforated near the top, the stem D, the encircling yoke L, with pivoted link-fulcrum K and slotted guide M, and the weighted lever J, combined and operating substantially as and for the purpose set forth.

JAMES DANBY.

Witnesses:

CHAS. K. GAND,

W. B. HICKMAN.